United States Patent
Traut

(10) Patent No.: US 6,651,132 B1
(45) Date of Patent: Nov. 18, 2003

(54) SYSTEM AND METHOD FOR EMULATING THE OPERATION OF A TRANSLATION LOOK-ASIDE BUFFER

(75) Inventor: Eric P. Traut, San Carlos, CA (US)

(73) Assignee: Microsoft Corporation, Redmond, WA (US)

(*) Notice: Subject to any disclaimer, the term of this patent is extended or adjusted under 35 U.S.C. 154(b) by 328 days.

(21) Appl. No.: 09/617,709

(22) Filed: Jul. 17, 2000

(51) Int. Cl.[7] ............................................. G06F 12/00
(52) U.S. Cl. ........................ 711/6; 711/203; 711/206; 711/208; 711/209
(58) Field of Search .............................. 711/6, 203, 206, 711/208, 209

(56) References Cited

U.S. PATENT DOCUMENTS

| | | | |
|---|---|---|---|
| 3,902,164 A | * 8/1975 | Kelley et al. ............... 711/206 |
| 4,456,954 A | * 6/1984 | Bullions, III et al. ....... 711/207 |
| 4,669,043 A | * 5/1987 | Kaplinsky ..................... 711/3 |
| 4,779,188 A | 10/1988 | Gum et al. ................. 364/200 |
| 4,814,975 A | * 3/1989 | Hirosawa et al. .............. 709/1 |
| 4,875,186 A | 10/1989 | Blume, Jr. .................. 364/900 |
| 5,063,499 A | 11/1991 | Garber ....................... 395/500 |
| 5,278,973 A | 1/1994 | O'Brien et al. ............. 395/500 |
| 5,301,277 A | 4/1994 | Kanai ......................... 709/301 |
| 5,317,705 A | * 5/1994 | Gannon et al. ............. 709/100 |
| 5,367,628 A | 11/1994 | Ote et al. ................... 345/501 |
| 5,406,644 A | 4/1995 | MacGregor ................. 395/500 |
| 5,448,264 A | 9/1995 | Pinedo et al. .............. 345/508 |
| 5,452,456 A | 9/1995 | Mourey et al. ............. 713/100 |
| 5,502,809 A | 3/1996 | Takano ....................... 345/509 |
| 5,574,936 A | * 11/1996 | Ryba et al. ................... 712/30 |
| 5,617,552 A | 4/1997 | Garber et al. .............. 395/401 |
| 5,640,562 A | 6/1997 | Wold et al. ................. 395/652 |
| 5,666,521 A | 9/1997 | Marisetty ................... 345/525 |
| 5,675,382 A | 10/1997 | Bauchspies ................. 348/390 |
| 5,699,539 A | 12/1997 | Garber et al. .............. 395/402 |
| 5,742,797 A | 4/1998 | Celi, Jr. et al. ............. 345/507 |
| 5,752,275 A | 5/1998 | Hammond .................. 711/207 |
| 5,757,386 A | 5/1998 | Celi, Jr. et al. ............. 345/507 |
| 5,768,593 A | 6/1998 | Walters et al. ............. 395/705 |
| 5,790,825 A | 8/1998 | Traut .......................... 712/209 |
| 5,815,686 A | 9/1998 | Earl et al. ................... 395/500 |
| 5,831,607 A | 11/1998 | Brooks ....................... 345/333 |
| 5,860,147 A | 1/1999 | Gochman et al. .......... 711/207 |
| 5,940,872 A | 8/1999 | Hammond et al. ........ 711/207 |
| 6,008,847 A | 12/1999 | Bachspies .................. 348/391 |
| 6,014,170 A | 1/2000 | Pont et al. .................. 348/232 |
| 6,026,476 A | 2/2000 | Rosen ......................... 711/206 |
| 6,067,618 A | 5/2000 | Weber .......................... 713/1 |
| 6,115,054 A | 9/2000 | Giles .......................... 345/522 |
| 6,477,612 B1 | * 11/2002 | Wang ............................. 711/2 |
| 6,496,847 B1 | * 12/2002 | Bugnion et al. .............. 709/1 |

FOREIGN PATENT DOCUMENTS

| | | | |
|---|---|---|---|
| EP | 0 524 773 A1 | 7/1992 | ............ G06F/9/44 |
| EP | 0 645 701 A2 | 9/1994 | ........... G06F/9/455 |
| WO | WO 98/57262 | 12/1998 | ........... G06F/9/455 |

OTHER PUBLICATIONS

Reinholtz et al., "High–performance Software Emulation of 1750A Processor," pp 1–7, IEEE, 1997.*

(List continued on next page.)

Primary Examiner—Kevin L. Ellis
Assistant Examiner—Stephen Elmore
(74) Attorney, Agent, or Firm—Woodcock Washburn LLP

(57) ABSTRACT

A method for tracking the changes to the emulated page tables of a host computer system is disclosed in which each memory location accessed by the guest computer system is placed on one of several hierarchical address translation lists maintained by the host computer system. In response to one or more events in the guest computer system, the contents of one or more of the address translation lists of the host computer system are unmapped as a means of tracking in the host computer system changes made to the address translation of virtual addresses to physical addresses in the emulated computer system.

20 Claims, 6 Drawing Sheets

OTHER PUBLICATIONS

Uhlig et al., "Design Tradeoffs for Software–Managed TLBs," pp 175–205, ACM, Aug. 1994.*

Bugnion et al., "Disco: Running Commodity Operating Systems on Scalable Multiprocessors," pp 143–156, ACM, 1997.*

"Processor Instruction Sets," The PC Guide, version date Dec. 18, 2000, http://www.pcguide.com/ref/cpu/arch/int/inst–c.html.

"M68060 User's Manual," Motorola, 1994, pp. i–xviii; Section 4, Memory Management Unit, pp. 4–1 to 4–30, http://e–www.motorola.com/brdata/PDFDB/MICROPROCESSORS/32_BIT/68K–COLDFIRE/M680X0/MC68060UM.pdf.

"MPC750, RISC Microprocessor User's Manual," Motorola, 8/97, Contents, pp. iii–xvi; Chapter 5, Memory Management, pp. 5–1 to 5–34; Glossary, pp. Glossary–1 to Glossary–13, http://e–www.motorola.com/brdata/PDFDB/MICROPROCESSORS/32_BIT/POWERPC/MPC7XX/MPC750UM.pdf.

PCT International Search Report in International Application No. PCT/US 01/22277, International filing date Jul. 16, 2001, mail date Feb. 7, 2002.

PCT International Search Report in International Application No. PCT/US 01/22276, International filing date Jul. 16, 2001, mail date Mar. 7, 2002.

Traut, E, "Building the Virtual PC," *Byte*, McGraw–Hill Inc., vol. 22, No. 11, pp. 51–52, Nov. 1, 1997.

"Intel386 DX Microprocessor," *Intel*, pp. 32–58, Dec. 31, 1995.

"MacIntosh and Technology: Changing Chips in the Middle of the Stream, or Apple Takes a Risc," URL:www.btech.co/changingchips.html, paragraphs '0006!–'0007!, retrieved Dec. 10, 2001.

"M68040 User's Manual," Motorola, Inc., Chapter 3, copyright 1990, revised 1992, 1993.

Osisek DL et al., "ESA/390 Interpretive–Execution Architecture, Foundation for VM/ESA," *IBM Systems Journal*, vol. 30, No. 1, pp. 34–51, 1991.

Shang Rong Tsai et al., Ón the Architectural Support for Logical Machine Systems, *Microprocessing and Microprogramming*, vol. 22, No. 2 pp. 81–96, Feb. 1988.

* cited by examiner

SYSTEM AND METHOD FOR EMULATING THE OPERATION OF A TRANSLATION LOOK-ASIDE BUFFER

TECHNICAL FIELD OF THE INVENTION

The present invention relates in general to the field of virtual memory management and, more particularly, to a method for emulating the operation of a memory management unit.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680x0 processor family, manufactured by Motorola, Inc. of Phoenix, Arizona; the Intel 80x86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80x86 processor family is incompatible with the instruction set used by the PowerPC processor family. The Intel 80x86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80x86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will want to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the host computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80x86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

Because the size of application programs has increased over time and because there are operating advantages afforded to multitasking operating system environments, many computer systems employ a virtual memory system in which a large virtual address space is defined for each application program. The virtual memory is divided into blocks of memory known as pages. To accommodate the size of the virtual address space, a limited number of the virtual memory pages are mapped to short-term physical memory, such as dynamic RAM. The remainder of the virtual memory pages are mapped to long-term storage, such as hard disk drives. The division of virtual memory between short-term RAM storage and long-term hard disk storage is an aid to multitasking operating systems in that several programs can share the RAM memory of the system.

Virtual memory systems are implemented through the use of a page table, which is an indexed data structure that relates logical memory addresses to physical memory addresses. Because programs operating in a virtual memory system will access data locations according to their virtual memory address, the virtual memory address must be translated to a physical memory address to complete the read or write operation. The page table is used by the operating system to translate the virtual page address to a physical page address. A page table contains virtual to physical memory translations consisting of a virtual page number and a corresponding physical page number. Following the translation, the processor accesses the data using the physical page address.

Because tables are often stored in main memory, access to virtual memory is often time-consuming. Virtual memory requires two memory accesses to fetch a single entry from memory. The first access is to the page table and is made to map the virtual address to the physical address. After the physical address is known, a second access is required to fetch the data from physical memory. In an effort to speed up memory accesses, conventional microprocessors use a special purpose cache memory to store certain virtual to physical memory address translations. This cache is often referred to as a translation look-aside buffer (TLB). The number of virtual to physical memory translations in a TLB is typically smaller than the total number of translations in the page table. In operation, prior to seeking the translation of a of a virtual address from the page tables stored in main memory, a processor can first refer to the TLB to determine whether the physical address translation of the virtual address is stored in the TLB. If the translation of the virtual address to the physical address is stored in the TLB, the TLB outputs to the process the physical address and a time-consuming access to main memory is avoided.

Many emulator programs attempt to emulate the virtual memory operation of the guest hardware architecture and operating system. In this manner, the emulator application, which runs on the host operating system, emulates the operation of the guest hardware architecture and guest operating system. In an attempt to closely mimic the operation of the guest hardware architecture and operating system, the emulator program will attempt to mimic the manner in which the guest processor and operating system populate a page table and an emulated translation look-aside buffer. To provide full emulation, the emulation program must attempt to track the page tables established by the guest processor and guest operating system. The emulation program must also attempt to track the guest processor's attempts to store address translations in an emulated translation look-aside buffer. Difficulties arise when the emulation program is faced with the task of unmapping certain address translations stored in a related page table maintained by the host computer system following commands issued by the guest processor and operating system.

The family of Intel 80×86 processors include commands to invalidate certain entries in the translation look-aside buffer. One such command invalidates a single entry in the translation look-aside buffer following a change to the physical location of a virtual memory address. Another command invalidates or flushes the entire content of the translation look-aside buffer following a significant number of changes to the address translations in the page table. The flush occurs often in those instances in which an 80×86 processor must switch between two competing multitasking processes. As the processor switches between multitasking processes, the processor may issue the TLB flush instruction.

For the emulation program, the difficulty of the TLB flush instruction is identifying the address translations in the page table maintained by the host system that must be unmapped. In the case of an instruction from an emulated 80×86 processor invalidating a single entry in the TLB, the emulation program can more easily identify the translation entry that must be unmapped. Unmapping address translations is substantially more difficult and time-consuming if the TLB flush instruction is given by the processor. According to known methods of compensating for a TLB flush instruction, the entire page table must be polled to make certain that none of the physical addresses identified for the virtual addresses in the page table have been modified. This process usually involves making a direct comparison between the contents of the virtual page table of the guest system and the page table maintained by the host operating system for use by the emulation program. The process of polling the entirety of the page table, although necessary in the case of a TLB flush instruction, is time-consuming. The emulation program also may face a difficult task in emulating the operation of the memory management unit of the guest operating system as the guest operating system transitions between memory access levels. The page table of a guest operating system may track, for each virtual memory address translation, the memory privilege level of the memory location. Some pages in memory may only be only accessed by privileged or system-level code of the operating system and may not be accessed by user-level code of the operating system. Other locations in memory may be accessed by system-level code in the guest operating system on read and write basis, while the same memory location may only be accessed by user-level code on a read-only basis. Thus, the guest operating system may attempt to track in its page tables the memory access levels of the memory locations identified in the page tables. It is typical that the host operating system will allow the emulation program to run with user-level privileges. It is also possible that the host operating system will have a different set of semantics or different format for its memory access levels and privileges. The host operating system will also seek to monitor those instances in which the guest operating system has transitioned between a more privileged memory access level and a less privileged memory access level. In this instance, the emulation program will seek to update any page table maintained in the host operating system to track the page table that is now accessible by the less privileged memory access level of the guest operating system. As in the case of TLB flush instruction, tracking the changes to the emulated page table of the guest operating system has proved difficult in view of the multiple memory access levels of a typical guest operating system and the ability of the guest operating system to transition between more privileged memory access levels and less privileged memory access levels.

SUMMARY OF THE INVENTION

In accordance with the present invention, a method is provided for altering the format of a text string that has populated a data field of a web-generated document or proof.

The present invention concerns a method for emulating the operation of a memory management unit. An emulator program tracks the changes to the page table of a guest computer system by maintaining a set of hierarchical lists of the memory locations accessed by the emulated computer system. An address translation for each memory location accessed by the guest computer system is placed on one of the hierarchical lists. In response to an action taken in the guest computer system resulting in a number of changes to the page table of the guest computer system, the entries in one or more of the hierarchical address translation lists are unmapped so that the content of the page table of the host computer system is similar to the content of the emulated page table of the guest computer system.

The technique disclosed herein is advantageous in that it improves the performance of emulated computer systems. When the host computer system makes a set of changes to its page table, the process of the present invention permits the host computer system to locate the address translations that must be unmapped for the physical page table of the host computer system to match the emulated page table of the guest computer system. In doing so, the process of the present invention avoids the technique of comparing the contents of the page table on an entry-by-entry basis.

The technique of the present invention is also advantageous in that it permits the hierarchical arrangement of the address translation lists maintained by the emulation program and the host computer system. The address translation lists are arranged such that the address translations that must be unmapped most frequently are grouped on a certain address translation list. A category of address translations that must be unmapped less frequently is placed on another list, and so on. When an action occurs in the guest computer system calling for the unmapping of the most frequently unmapped set of address translations, the address translations in the remaining lists of address translations are not unmapped. Rather, these translations remain in the page table of the host computer system until such time as an action occurs in the guest computer system that requires that this set of addresses be unmapped. In this manner, the lists of address translations can be selectively arranged so that they correspond to actions taken in the guest computer system, allowing the list of addresses to be unmapped in the host computer system according to a technique in which address translations are unmapped according to their unmapping frequency or relation to other address in the guest computer system.

Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

The present invention provides an emulation technique in which the emulation program emulates the operation of the memory management unit of the guest processor in a manner that allows the emulation program to track the address translations of the emulated page tables of the guest processor. The emulation program establishes in main memory a hierarchy of address translation lists as a means of updating a page table maintained by the host system for the emulation program. The address translation lists of the emulation program are populated with the address translations of the memory locations that have been accessed by the guest processor. The address translation lists may be accessed by the emulated program when it is necessary for the host processor to unmap from its page table certain address translations as a result of actions taken by the guest processor. The most common action taken by the guest processor that would cause the unmapping of address translations maintained by the host processor is a transition from a first multitasked operation to a second multitasked operation, or a transition in the operating system from a more privileged memory-access level to a less privileged memory-access level. When one of these unmapping events occurs in the emulated system, the emulation program accesses one or more of the address translation lists to identify those address translations that have been mapped in the host system that must be unmapped as a result of the action of the emulated system.

Figure 1:
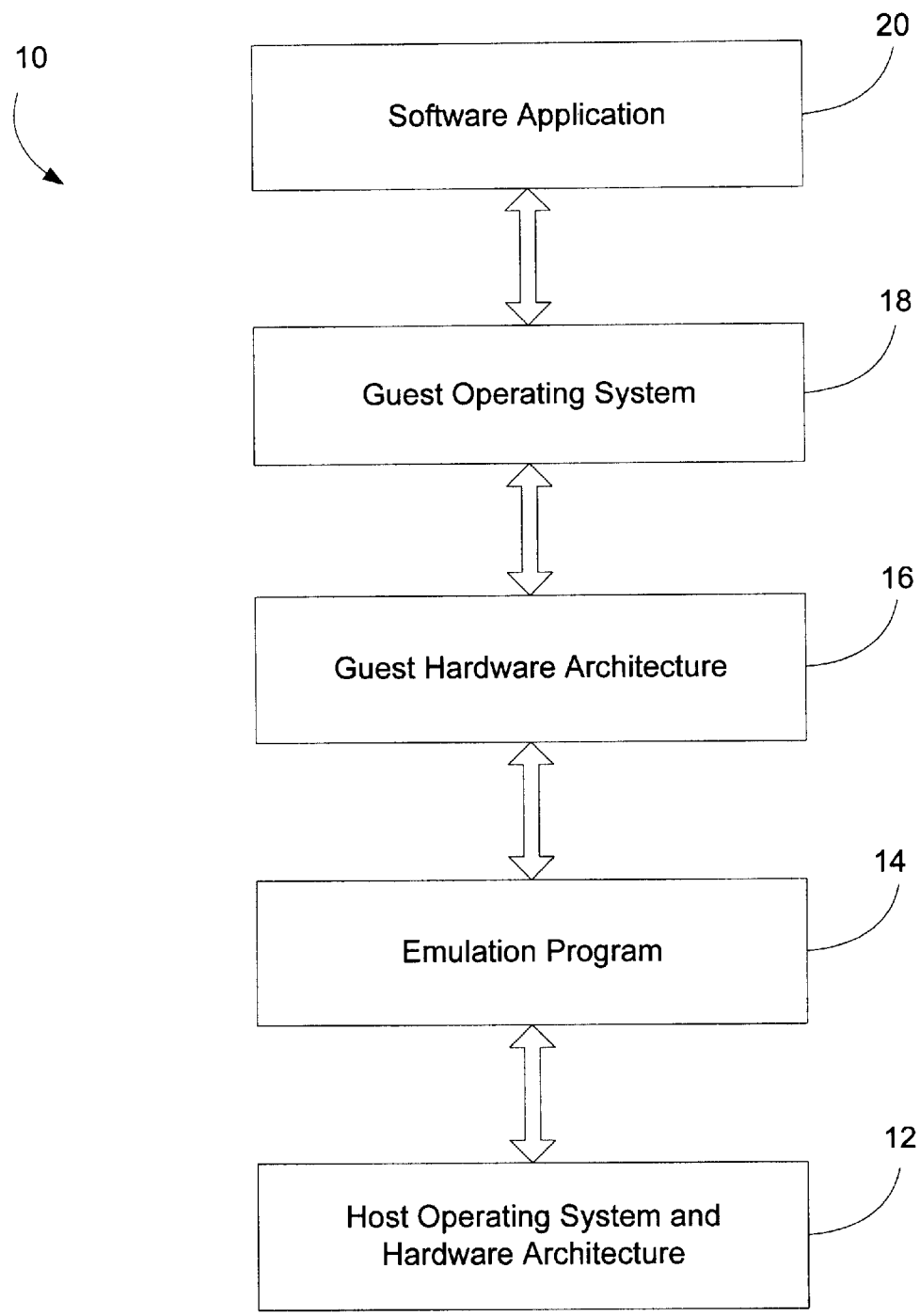
FIG. 1 is a diagram of the logical relationship of the elements of an emulated computer system running in a host computer system.

Shown in FIG. 1 is a diagram of the logical layers of the hardware and software architecture for an emulated operating environment in a computer system 10. An emulation program 14 runs on a host operating system and/or hardware architecture 12. Emulation program 14 emulates a guest hardware architecture 16 and a guest operating system 18. Software application 20 in turn runs on guest operating system 19. In the emulated operating environment of FIG. 1, because of the operation of emulation program 15, software application 20 can run on the computer system 10 even though software application 20 is designed to run on an operating system that is generally incompatible with the host operating system and hardware architecture 12.

Figure 2:
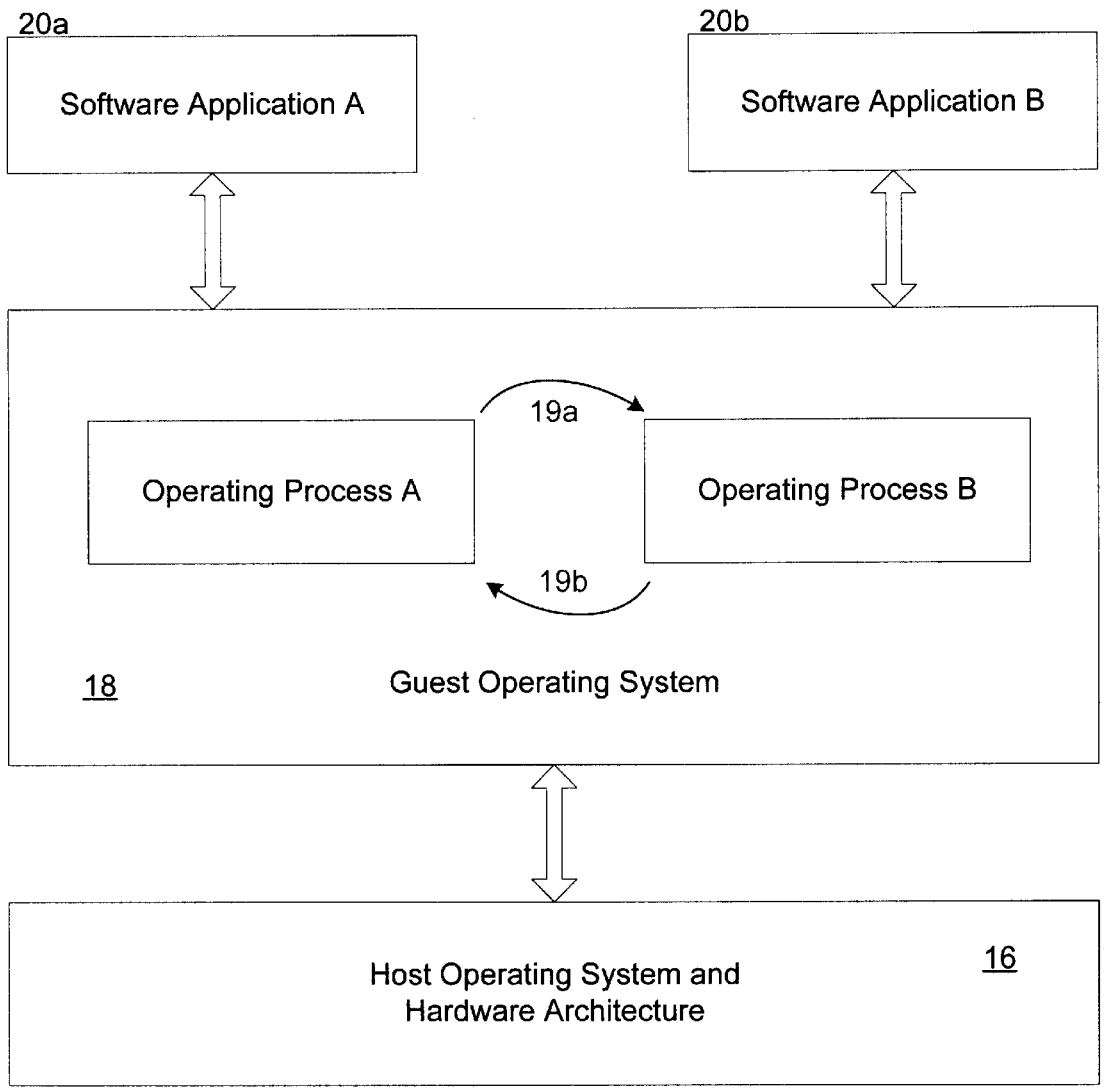
FIG. 2 is a diagram of the switching between competing operating processes in an emulated computer system.

Shown in FIG. 2 is a diagram of the logical switching of two software applications in a multitasking operating system environment. As the guest or emulated operating system 18 switches 19a and 19b between competing operating processes A and B corresponding to software application A 20a and software application B 20b respectively, architecture and processor 16 will typically issue a TLB flush instruction, causing the entire contents of the TLB to be invalidated as the guest processor and guest operating system switch among competing multitasked operations. The TLB flush instruction is necessary part of the transfer of the guest system between competing processes because the virtual memory map of competing processes may occupy the same address space. If the TLB were not flushed when the system switches from a first multitasked operation to a second multitasked operation, the processor as part of the second multitasked process may read address translations from the TLB and access incorrect physical addresses and incorrect data as a result.

Figure 3:
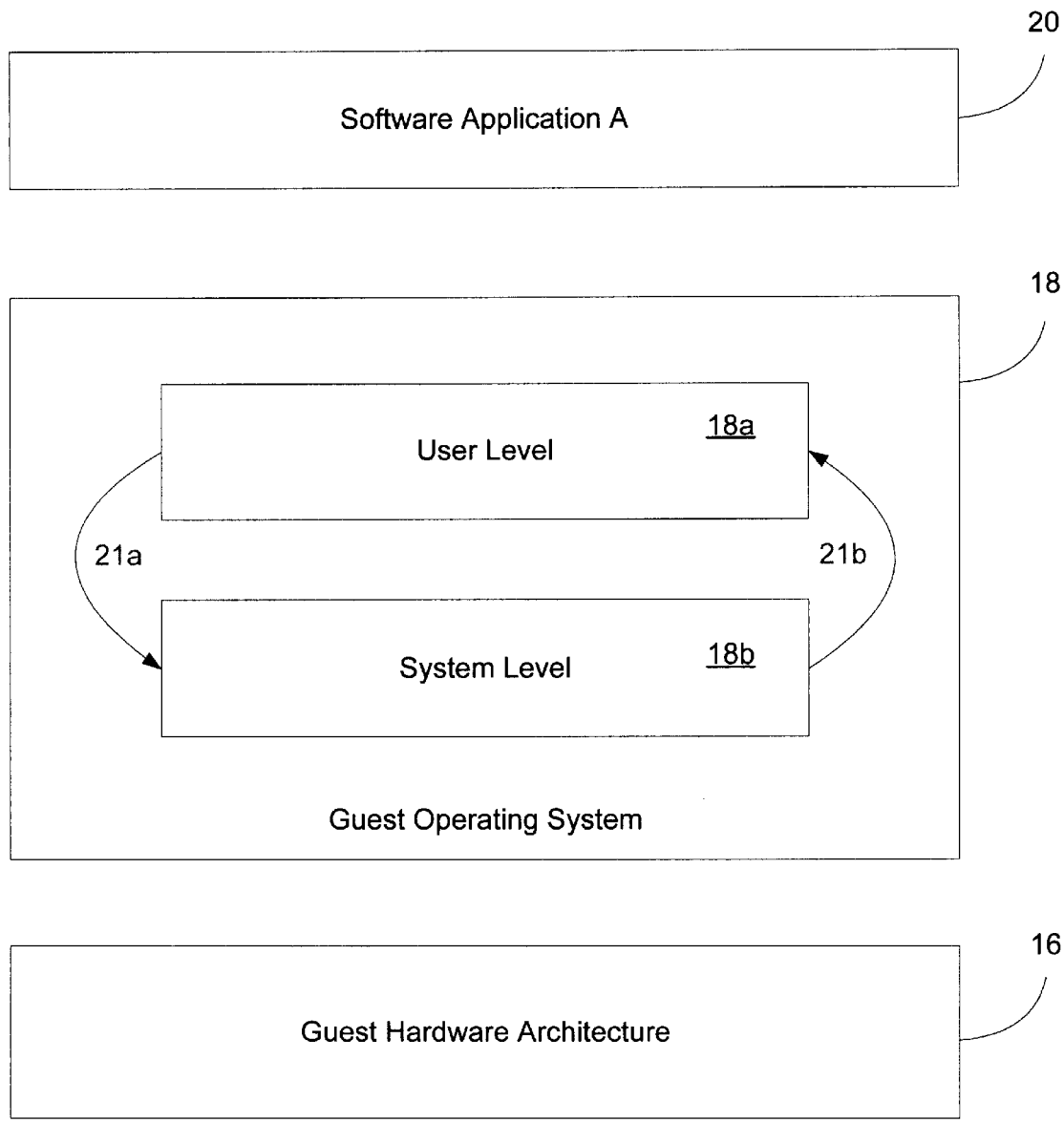
FIG. 3 is a diagram of the switching between memory access levels in an emulated computer system.

Shown in FIG. 3 is a diagram of the logical switching between the user-level and the system level of the guest operating system. Guest operating system 18 may switch 21a and 21b between memory system privilege levels during operation, including switching from a less privileged user level 18a and a more privileged system level 18b. As the guest operating system switches between memory access levels, the host computer system must attempt to unmap certain address translations in the page table maintained by the host system to track the changes to the virtual page table of the guest operating system. In this manner, as the guest operating system transitions to a less privileged memory access level, the host computer system must likewise update its corresponding page table to reflect the current memory access level of the guest operating system.

Figure 4:
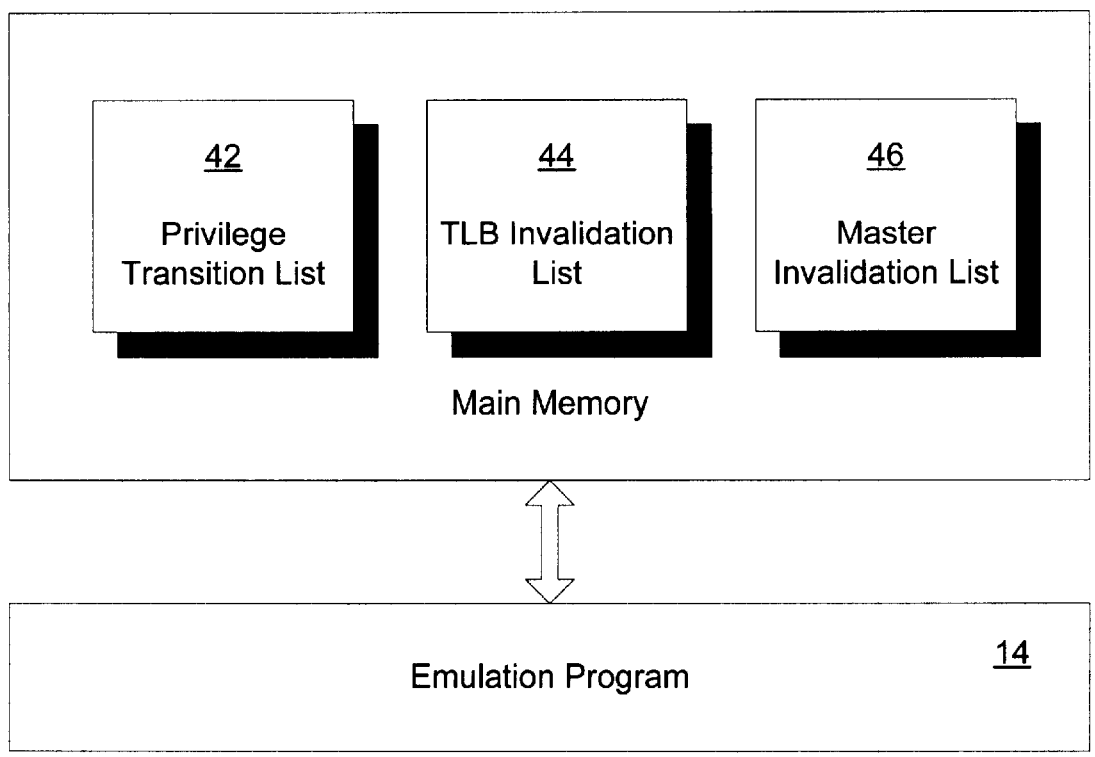
FIG. 4 is a diagram of communication of the address translation lists of main memory.

The present invention involves a technique that permits the page table of the host computer system to more easily track the emulated page table of the guest computer system. The system involves a technique for tracking the virtual memory locations accessed by the emulated operating system and unmapping address translations for those virtual memory addresses following certain actions in the emulated computer system. Shown in FIG. 4 is a representation of the address translations lists maintained by the host computer. In the example of FIG. 4, the host computer stores in main memory 40 three lists of address translations: a privilege transition list 42, a TLB invalidation list 44, and a master invalidation list 46. The emulation program of the present invention tracks changes to the emulated page tables of the emulated computer system by placing the address translation of each page accessed by the guest operating system on one of the three address translation lists. In this manner, if a TLB flush instruction occurs in the guest processor, the emulation program need not perform the time-consuming task of reconciling the contents of the host page table with the contents of the emulated page table. Similarly, if the memory privilege level of the guest operating system transitions from a more privileged level to a less privileged level, the emulation program can easily track those entries in the page table of the host system that must be unmapped to match the less privileged memory access level of the guest operating system.

As an example, when the guest operating system seeks to access a particular address, the read or write operation is performed through the memory management unit of the host computer. The emulation program first determines if the virtual memory address to be accessed has been mapped into the page table of the host computer system. If the virtual memory address has not been mapped in, the host computer system issues a page fault and reads from the emulated page tables of the guest operating system to retrieve the addressing information of the virtual memory address. In addition to retrieving the associated physical address of the virtual memory address, the emulation program also identifies the privilege level of the physical memory address and whether the physical memory address is a global page. Recent processors of the Intel 80x86 processor family recognize the use of global pages, which are memory addresses established for frequently accessed user-level routines or memory locations that are mapped to the same virtual memory address regardless of the operating process being executed by the processor. Global pages are unique in that they are accessed at the same virtual and physical memory location as part of every operating process.

After the emulation program has determined the associated physical memory address, its memory access privilege level, and whether or not the address is a global page, the emulation program instructs the host operating system to map in the address on a page table of the host system. The completion of the page fault process is a method employed by the emulator to build a page table that tracks the page table of the emulated system. The page fault technique, however, is insufficient to solve the difficulty of the emulator in tracking the address translations of the emulated system when the emulated system switches memory access privilege levels, switches between operating processes, or issues a global invalidation instruction.

Figure 5:
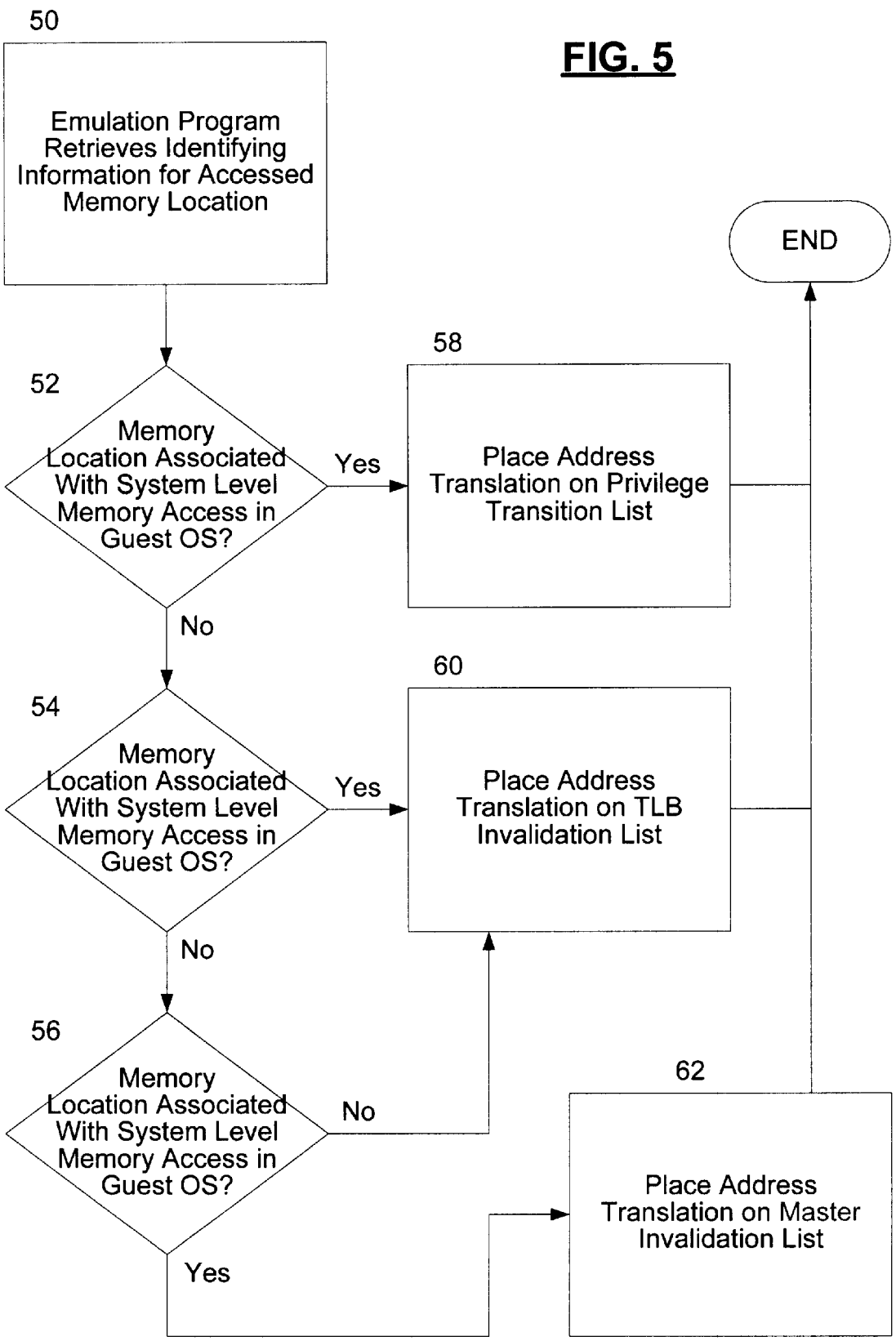
FIG. 5 is a flow diagram of the process for assigning an address translation to one of the address translation lists of the host computer system.

Shown in FIG. 5 is a flow diagram for identifying the address translation list that will receive the address translation for the memory location that was accessed by the guest computer system. Identifying the proper address translation list involves determining whether the address translation should be placed on the list that is the most restrictive, i.e., the list that of addresses that is unmapped most often. The address translation retrieved by the emulator program at step 50 following a page fault is next stored on one of the three address translation lists of FIG. 4. First, it is determined by the emulator at step 52 if the physical address is identified as an address associated with a system-level memory access privilege in the guest operating system. If so, the address translation for the memory location is placed on the privilege transition list at step 58. If the address is not associated with a system-level memory access privilege in the guest operating system, processing continues at step 54, where it is determined if the memory location accessed by the guest system is associated with an operating process run on the guest operating system. If so, the address translation for the memory location is placed on the TLB invalidation list 44 at step 60. If not, processing continues at step 56, where it is determined if the memory location accessed by the guest system is a global page. If the memory location is part of a global page, at step 62 the address translation for the accessed memory location is placed on the master invalidation list 46. Otherwise, the address translation is placed on the TLB invalidation list at step 60, as this memory location is one that is now assigned, as a default, as an address that is associated with an operating process run on the guest operating system. In this manner, each memory location accessed by the guest system is placed on one of the three address translation lists.

The placement of the memory locations accessed by the guest system on one of the three address translations lists permits the host system to more accurately track the page table of the guest system. The host system includes a page table, and the emulation program uses the memory management unit of the host system to perform all of the memory management features of the guest system. Because the host system's memory management unit maintains a separate page table, it is critical that the host's page table not contain address translations that are different from or not properly accessible by the operating process running on the emulated system. The use of the address translation lists permits the host to more quickly unmap or invalidate certain address translation in the host page table in response to action taken by the guest processor. In this manner, the host page table will more closely match the emulated page table of the guest system and will not contain spurious entries that could cause a potential detrimental effect to the operation of the host system or the guest system.

As an example, when the guest operating system switches from a more privilege memory access level to a less privileged memory access level, each address translation in the privilege translation list is invalidated in the page table of the host operating system. Following the unmapping process, the entries of the privilege translation list are removed from the list. The a invalidation of each of the entries in the privilege transition list is necessary so that the page table of the host system does not contain address translations that are not accessible to the guest system, which is now operating in a less privileged memory access level. If the address translations appearing on the privilege transition list were not invalidated upon a transfer to a less privileged memory access level, the entries would remain in the page table of the emulation program, resulting in the continuing possibility that these addresses would be accessed by the less privileged memory access level of the guest operating system. Once the address translations are invalidated, the page table maintained by the emulation program does not contain address translations for memory location that are inaccessible to the memory access level of the guest operating system. Thus, when the guest operating system switches from a more privileged memory access level to a less privileged memory access level, each address translation in the privilege transition list is unmapped in the page table of the host system. This unmapping function, however, does not occur when there is a transition from a less privileged memory access level to a more privileged memory access level. In a transition of this latter sort, in which the later memory access level has more privileges than the earlier memory access level, there is not a danger that the guest operating system will access addresses through the page table of the emulator program that are not logically available to the memory access level of the guest operating system.

If the guest operating system switches between operating processes, such as when the guest operating process switches between a word processing operating process and a web browser operating process, each address translation in the TLB invalidation list is unmapped in the page table of the host system. Following the unmapping of the entries in the TLB invalidation list, the entries in the TLB invalidation list are deleted from the list. This address translation list is labeled the "TLB invalidation list" because a TLB flush instruction in an Intel 80×86 processor often accompanies a transition between operating processes. For the purposes of the unmapping processes of the present invention, it is assumed that a transition between operating processes necessarily involves a TLB invalidation instruction. This instruction is generally necessary because the range of virtual memory address of two host processes often overlap, thereby mandating that the entire contents of the TLB be invalidated to prevent the processor from accessing incorrect data in response to a call to a virtual memory address. Similarly, the address translations appearing on the TLB invalidation list must likewise be unmapped from the page table of the host system. Otherwise, the page table of the host system will contain entries that do not reflect the page table and the memory map of the guest system. By unmapping in the host page table each entry in the TLB invalidation list, the page table of the host system will not contain any address translation associated with the previous operating process.

The address translation lists of the present invention are hierarchical in nature. To make certain that all address translations associated with the prior operating system are removed from the page table of the host system, the address translations on the privilege transition list are likewise unmapped in the page table of the host system when there is a transition from a first operating process to a second operating process in the guest operating system. Because each entry in the TLB invalidation list and the privilege transition list are unmapped upon a transition from a first operating process to a second operating process in the guest operating system, each address translation associated with the prior operating process is unmapped in the page table of the host system such that there are no entries in the host operating system that could cause the emulator program to access spurious data through the address translations of its page table.

Finally, if the guest operating system alters the mapping of its global memory addresses, each address on the global invalidation list is unmapped in the page table of the host system. The remapping of global memory addresses may occur if a new code library is mapped into the guest operating system and the guest operating system wants to make this code library available to all running programs in the guest system. Mapping in of the new code may cause a remapping of the existing global pages. Following the unmapping of the global pages and the other universal pages listed on the global invalidation list in the page table of the host system, the emulator program unmaps each entry in the TLB invalidation list and the privilege transition list. In this manner, each memory address that was at one time accessed by the guest system is unmapped in the page table of the host system. The hierarchical relationship of the three address translation lists permits the unmapping of only a subset of the address translation lists following an action of the guest system. According to this hierarchical system and the example discussed above, only the addresses on the privilege transition list must be unmapped when there is a transition from a more privileged to a less privileged memory access level in the guest operating system. When there is a transition from a first operating process to a second operating process, all address translations accessed by the guest system with the exception of the global pages and other universal pages on the global invalidation list are unmapped. Also, as can be seen from this hierarchical structure, the entries on the privilege transition list can be unmapped and the is entire privilege transition list can be invalidated numerous times between those instances in which the TLB invalidation list must be unmapped and the contents of the list invalidated. Similarly, the contents of the privilege transition list and the TLB invalidation list can be unmapped numerous times, while the contents of the global invalidation list remain mapped into the page table of the host system. The hierarchical unmapping that is introduced by the hierarchical relationship of the address translation lists allows the host system to conduct the limited amount of unmapping necessary to insure that the host page table does not contain spurious information relative to the emulated pages tables of the guest system.

Figure 6:
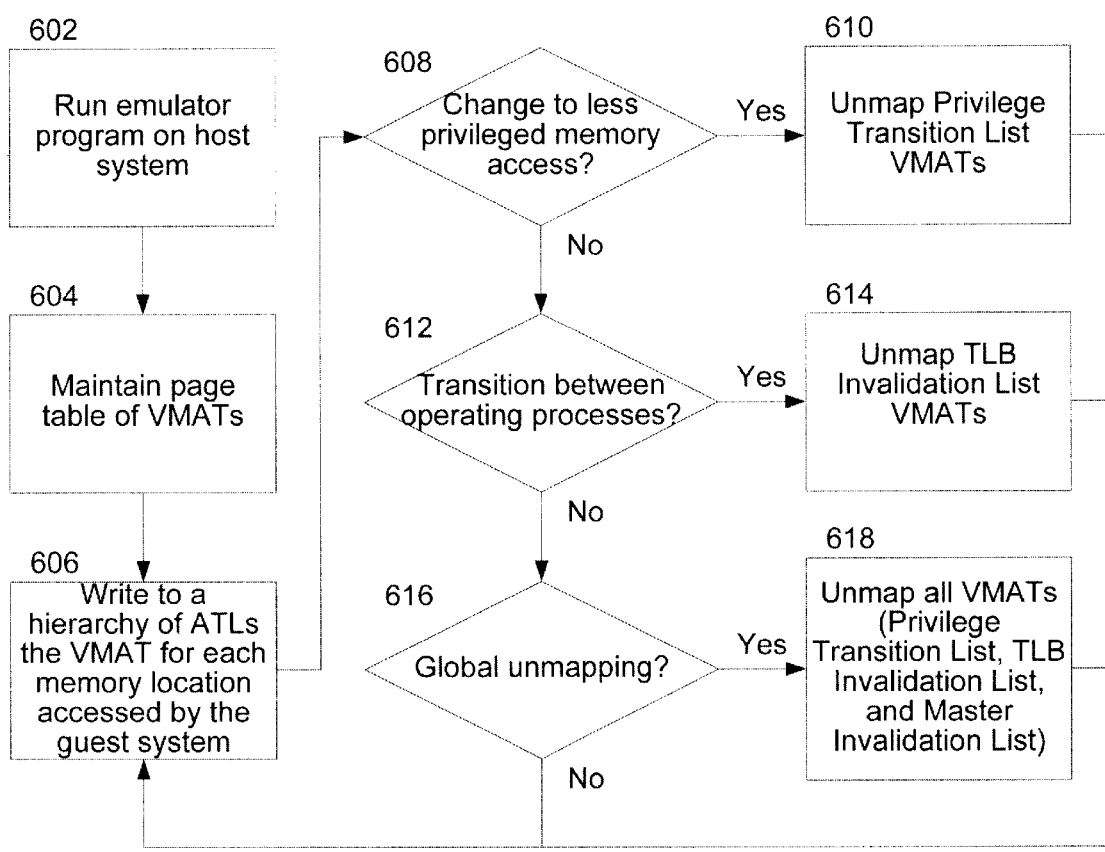
FIG. 6 is a flow chart illustrating one embodiment of the method for emulating in a host computer system the operation of a memory management unit of a guest computer system.

FIG. 6 is a flow chart illustrating one embodiment of the method for emulating in a host computer system the operation of a memory management unit of a guest computer system. At step 602, the host computer system runs an emulator program to emulate the operation of the memory management unit of the guest computer system. The host computer system then maintains in memory, at step 604, a page table of virtual memory address translations that correspond to a virtual page table of virtual memory address translations for the guest computer system. For each memory location accessed by the guest computer system, the host computer system, at step 606, writes to one or more address translation lists in a hierarchy of address translation lists (as described earlier herein). At step 608, if the guest operating system transitions from a more privileged memory access level to a less privileged access level (a predetermined event), then at step 610 a list of virtual address translations, specifically those corresponding to the Privileged Transition List 42 of FIG. 4 and as discussed earlier herein, are unmapped in the page table of the host computer system. Otherwise, at step 612, if the guest operating system transitions between operating processes (a predetermined event), then at step 614 a list of virtual address translations, specifically those corresponding to the TLB Invalidation List 44 of FIG. 4 and as discussed earlier herein, are unmapped in the page table of the host computer system. If not, then at step 616, if the guest operating system issues an instruction to unmap all address translations ("global unmap") (a predetermined event), then at step 618 a list of all virtual address translations, specifically those corresponding to the Privileged Transition List 42, the TLB Invalidation List 44, and the Master Invalidation List 46 of FIG. 4 (a.k.a., the Global Invalidation List 62 of FIG. 5) and as discussed earlier herein, and the last of which is never unmapped except for a global unmap command, are all automatically unmapped in the page table of the host computer system. If not, then the process restarts at step 606.

The emulation technique disclosed herein is advantageous in that every memory location accessed by the guest system is maintained on an address translation list maintained by the host system. By documenting the memory locations accessed by the guest system, the host system is able to compile a list of the address translations that must be unmapped in the event of certain actions of the host system. Moreover, the address translation lists are logically related to the action of the guest processor such that a certain action of the guest processor causes the unmapping of a set of addresses in a related address transition list. The address translation lists are also logically arranged so that guest system actions that result in the unmapping of the fewest address translations are placed lowest in the hierarchy, and those guest system actions that result in the unmapping are placed highest in the hierarchy. An action causing the unmapping of the address translations in the privilege translation list will not cause the unmapping of address translations in the TLB invalidation list or the global invalidation list. An operating process transition, however, will cause the unmapping of all of the address translations in the privilege transition list and the TLB invalidation list, and an event causing the unmapping of global pages will likewise cause the unmapping of every address translation entry tracked by the emulation program.

The technique of the present invention is not limited in its application to the emulation of the Intel 80×86 architecture. Rather, the emulation technique disclosed herein is applicable any time an emulator is attempting to emulate a guest system that incorporates both virtual memory and a cache of address translations. Neither is the technique limited to the specific examples of address translation lists identified above. Rather, more or fewer address translation lists may be employed in a hierarchical fashion to identify and isolate actions of the guest computer system that may require unmapping address translations from a corresponding page table maintained by the host computer system.

Although the present invention has been described in detail, it should be understood that various changes, substitutions, and alterations can be made thereto without departing from the spirit and scope of the invention as defined by the appended claims.

What is claimed is:

1. A method for emulating in a host computer system the operation of a memory management unit of a guest computer system, comprising a guest operating system, said method comprising the steps of:

running an emulator program on the host system that emulates the operation of the memory management unit of the guest computer system;

maintaining in the memory of the host computer system a page table of virtual memory address translations that corresponds to a virtual page table of virtual memory address translations of the guest computer system;

writing to an address translation list a virtual memory address translation for each memory location accessed by the guest computer system; and unmapping from the page table of the host computer system the address translation entries on the address translation list in response to an action taken by the guest computer system.

2. The method for emulating in a host computer system the operation of a memory management unit of a guest computer system of claim 1, wherein the address translation list comprises multiple address translation lists, the address translation lists being related to one another in a logical hierarchy such that an instruction to unmap one of the address translation lists will result in the automatic unmapping of one or more of the other address translation lists.

3. The method for emulating in a host computer system the operation of a memory management unit of a guest computer system of claim 2, wherein one of the address translation lists comprises a list of virtual memory address translations that are unmapped in the page table of the host computer system when the guest operating system transitions from a more privileged memory access level to a less privileged memory access level.

4. The method for emulating in a host computer system the operation of a memory management unit of a guest computer system of claim 2, wherein one of the address translation lists comprises a list of virtual memory address translations that are unmapped in the page table of the host computer system when the guest operating system transitions between operating processes.

5. The method for emulating in a host computer system the operation of a memory management unit of a guest computer system of claim 2, wherein one of the address translation lists comprises a list of global pages that are not unmapped in the page table of the host computer system unless the guest computer system causes the unmapping in the guest computer system of all address translations.

6. The method for emulating in a host computer system the operation of a memory management unit of a guest computer system of claim 1, wherein the address translation list comprises multiple address translation lists with the address translation lists related to one another in a logical hierarchy such that an instruction to unmap one of the address translation lists will result in the automatic unmapping of one or more of the other address translation lists;

wherein one of the address translation lists comprises a first list of virtual memory address translations that are unmapped in the page table of the host computer system when the guest operating system transitions from a more privileged memory access level to a less privileged memory access level;

wherein one of the address translation lists comprises a second list of virtual memory address translations that are unmapped in the page table of the host computer system when the guest operating system transitions between operating processes; and wherein a transition in the guest operating system between operating processes results in the unmapping of the second list of virtual memory address translations and the second list of virtual memory address translations.

7. In a computing environment in which a host operating system is emulating the operation of a guest computer system comprising a guest operating system, a method for tracking the memory addresses accessed by the guest operating system for the purpose of reconciling the content of a page table maintained by the host computer system and a virtual page table maintained by the guest computer system, comprising the steps of:

placing the address translation of each virtual memory address accessed by the guest computer system in an address translation list maintained by the host computer system; and unmapping in the host computer system each address translation in the address translation list upon the occurrence of a predetermined event in the guest computer system.

8. The method of claim 7, wherein the predetermined event is the transition of the guest operating system between memory access levels.

9. The method of claim 7, where in the predetermined event is the transition of the guest operating system from a more privileged memory access level to a less privileged memory access level.

10. The method of claim 7, wherein the predetermined event is the transition of the guest operating system between operating processes.

11. The method of claim 7, wherein the address translation list comprises multiple address translation lists, and wherein each address translation list collects a set of address translations that must be unmapped in the host computer system in response to a predetermined event in the guest computer system.

12. The method of claim 11, wherein one of the address translation lists comprises a list of address translations that must be unmapped in the event that the guest operating system transitions between memory access levels.

13. The method of claim 11, wherein one of the address translation lists comprises a list of address translations that must be unmapped in the event that the guest operating system transitions between operating processes that share the same virtual address map in the guest operating system.

14. A method for tracking in a page table of a computer system the contents of a page table of a guest computer system emulated in a host computer system, comprising the steps of:

identifying memory locations accessed by the guest computer system;

for each memory location accessed by the guest computer system, placing the address translation of the memory location on one of a plurality of address translation lists maintained by the host computer system; and when an event occurs in the guest computer system, unmapping from the page table of the host computer system the address translations appearing on one or more of the address translation lists, and, following the unmapping of a set of address translations from an address translation list, removing the address translations from the address translation list.

15. The method for tracking in a page table of a computer system the contents of a page table of an emulated computer system of claim 14, wherein the address translations are related to one another in a logical hierarchy such that an instruction to validate a selected address translation list results in the invalidation of each address translation list that is lower in the hierarchy than the selected address translation list, the address translation lists that are lower in the hierarchy are those address translation lists that contain addresses that must be unmapped most frequently.

16. A method for unmapping entries in a page table of a host computer system to track the content of a page table of a guest computer system, said guest computer system comprising a guest operating system, said method comprising the steps of:

compiling in the host system an address translation list of address translations for those memory locations accessed by the guest operating system; and unmapping in the page table of the host computer system the entries in the address translation list in response to an event in the computer system.

17. The method for unmapping entries in the page table of a host computer system to track the content of the page table of a guest computer system of claim 16, wherein the address translation list comprises multiple address translation lists.

18. The method for unmapping entries in the page table of a host computer system to track the content of the page table of a guest computer system of claim 17, wherein the multiple address translation lists are arranged hierarchically such that unmapping of a set of address translations in a selected address translation list causes the unmapping of hierarchically related address translation lists.

19. The method for unmapping entries in the page table of a host computer system to track the content of the page table of a guest computer system of claim 18, wherein a first address translation list contains a set of address translations that must be unmapped when the guest operating system transitions from a more privileged memory access level to a less privileged memory access level.

20. The method for unmapping entries in the page table of a host computer system to track the content of the page table of a guest computer system of claim 19, wherein a second address translation list contains a set of address translations that must be unmapped when the guest operating system transitions from a first operating process to a second operating process.

* * * * *

UNITED STATES PATENT AND TRADEMARK OFFICE
CERTIFICATE OF CORRECTION

PATENT NO. : 6,651,132 B1
DATED : November 18, 2003
INVENTOR(S) : Eric P. Traut

It is certified that error appears in the above-identified patent and that said Letters Patent is hereby corrected as shown below:

Column 3,
Line 12, delete the first occurrence of "of a";

Column 4,
Line 11, delete the second occurrence of "only";

Column 5,
Line 43, delete "and"
Line 46, delete "." and insert -- ; and -- therefor;

Column 6,
Line 33, insert "the guest hardware" before "architecture";
Line 38, insert -- a -- after "is";

Column 8,
Line 48, delete "a".

Signed and Sealed this

Sixteenth Day of March, 2004

JON W. DUDAS
*Acting Director of the United States Patent and Trademark Office*